Apr. 10, 1923.

L. A. DUNAJEFF

SPEED INDICATOR

Filed Jan. 31, 1922

1,451,064

2 sheets-sheet 1

LEONID A. DUNAJEFF INVENTOR.

BY

John P. Nikonow ATTORNEY.

LEONID A. DUNAJEFF INVENTOR.

BY John P. Nixonow ATTORNEY.

Patented Apr. 10, 1923.

1,451,064

UNITED STATES PATENT OFFICE.

LEONID A. DUNAJEFF, OF NEW YORK, N. Y.

SPEED INDICATOR.

Application filed January 31, 1922. Serial No. 533,069.

*To all whom it may concern:*

Be it known that I, LEONID A. DUNAJEFF, citizen of the United States, and resident of New York city, in the county of New York and State of New York, have invented certain new and useful Improvements in Speed Indicators, of which the following is a specification.

My invention relates to speed indicators and has a particular reference to indicators adapted to measure the velocity of a moving fluid by measuring its dynamic pressure by means of a well known Pitot tube.

The Pitot tube, when directly connected to an indicator, will register dynamic pressures, but the scale is usually graduated in units of velocity. The pressure, however, being proportional to the square of the velocity, the scale divisions must be of ever increasing length, so that the apparatus becomes impracticable for any wide range of velocities.

In my improved indicator I do not use the Pitot tube directly on an indicating element, but instead I produce artificially an equivalent pressure by means of a pump or blower in order to balance the pressure in the Pitot tube and use an ordinary speedometer to register the rotational velocity of the pump rotor. The pressure developed by a pump or blower is directally proportional to the square of the velocity or to the square of the number of revolutions per minute of the rotor or impeller. And the pressure in the Pitot tube being proportional to the square of the fluid velocity, it follows, that with my arrangement the number of revolutions of the pump impeller is directly proportional to the velocity of the moving fluid.

Accordingly I may use any ordinary speedometer, properly geared to the pump, in order to indicate directly velocity of the fluid. At the same time, by counting the impeller revolutions, I can determine the quantity of a fluid passing by the Pitot tube, or, if my apparatus, for instance, is installed on a boat, the total distance travelled.

My invention is more fully described in the accompanying specification and drawings in which—

Figure 1:
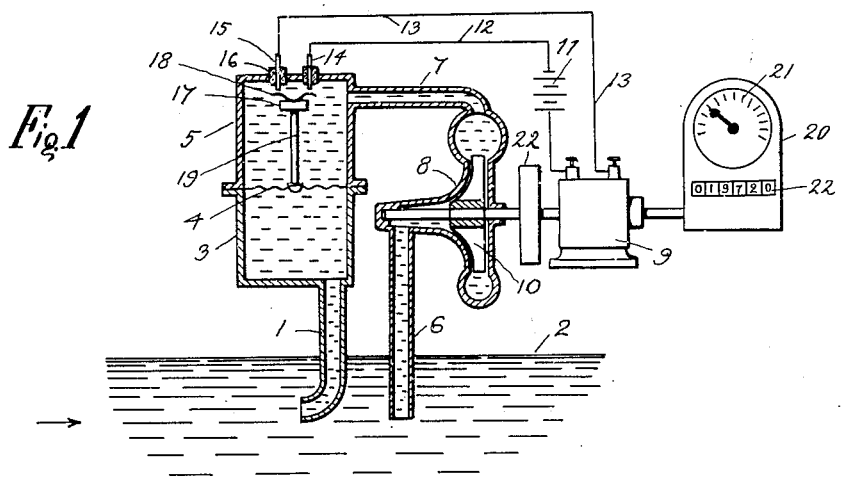
Figure 2:
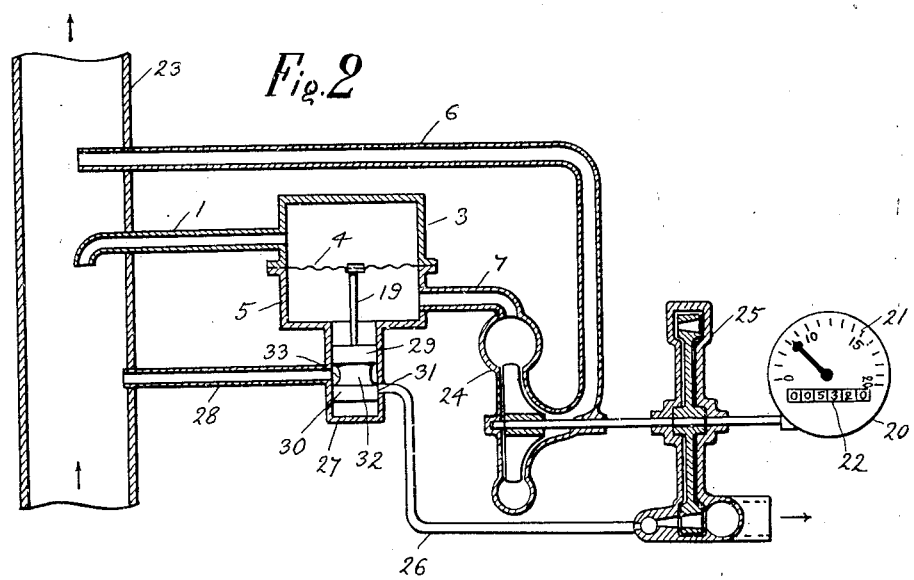
Figure 3:
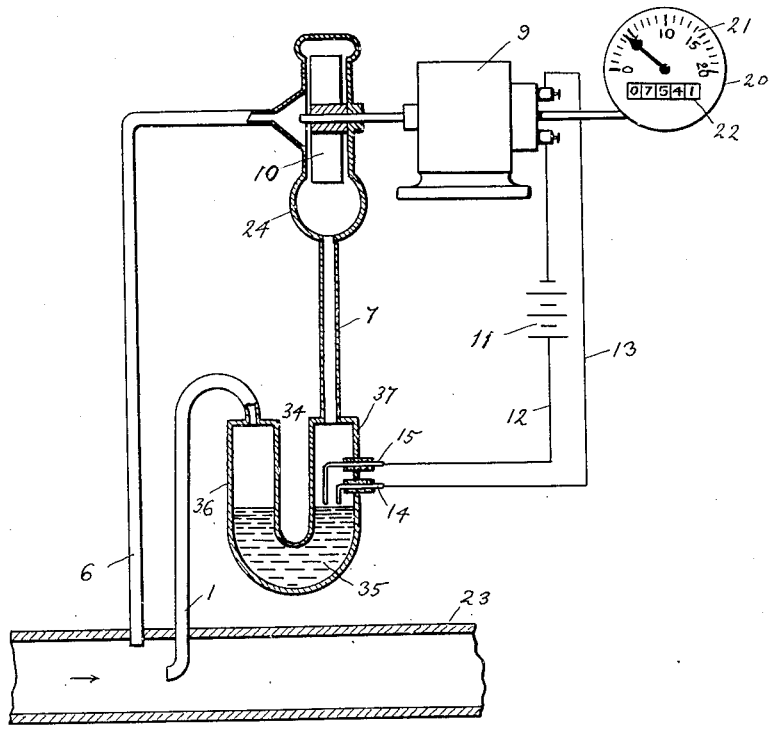
Figure 4:
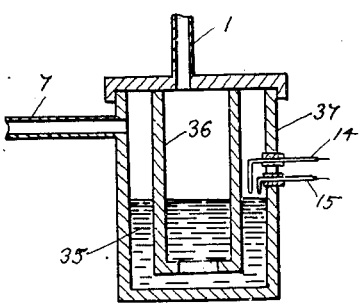

Fig. 1 is a sectional elevation of my apparatus as used in connection with liquids, Fig. 2 is the same applied to elastic fluids, and Fig. 3 is a modification in which a mercury column is employed instead of a diaphragm in order to separate the Pitot tube from the pump. Fig. 4 is a similar modification.

My speed indicator consists of a Pitot tube 1 immersed in a liquid 2. The other end of the tube is connected with a chamber 3 closed on one side with a diaphragm 4. The tube and the chamber are filled with a liquid.

A second chamber 5 is placed against the diaphragm from the other side and is connected with a straight supplemental tube 6 by means of a connecting tube 7. This second chamber and the tubes are also filled with a liquid.

The Pitot tube, having its aperture directed against the flow, registers both, dynamic and static pressure of the liquid, while the supplemental or balancing tube receives only static pressure, so that the separating diaphragm receives more pressure from one side and, accordingly, deflects toward the supplemental or balancing tube.

Without this diaphragm the liquid would flow continuously through the system, so that this diaphragm forms a yielding or elastic separator between the tubes.

In my apparatus I do not attempt to measure the diaphragm deflections, but, instead, I introduce a pressure producing device between the tubes 6 and 7 in order to balance the dynamic pressure in the Pitot tube and use only very small diaphragm deflections for controlling this pressure producing device.

A rotary pump 8 may be used for this purpose, preferably of a centrifugal type. Its intake is connected with the tube 6 and its exhaust with the tube 7. The impeller 10 is mounted on a common shaft with an electric motor 9 operated from the electric battery (or any other suitable source of electric current) 11. Wires 12 and 13 connect the motor and the battery with contact points 14 and 15 in insulation bushings 16 mounted in the wall of the chamber 5.

A contact spring 17 on an insulation block 18 is placed at a short distance from the contact points and is mounted on a rod 19 attached to the diaphragm 4.

A speedometer of an ordinary construction is mounted on the motor shaft and is geared so as to indicate on its scale 21 the relative velocity between the liquid and the Pitot tube in velocity units. At the same time the integrating wheels 22 of the speedometer 20 may be used to indicate the total distance travelled by the Pitot tube in a liquid (when, for instance, my apparatus is placed on a boat), or the quantity of a liquid passing by the Pitot tube, when my apparatus is used for recording the liquid movement in a pipe.

The operation of my device is as follows: The dynamic pressure (or velocity pressure) in the Pitot tube deflects the diaphragm 4 into the chamber 5 until the contact spring closes the contacts 14 and 15 thereby closing the electric circuit on the motor 9 and setting same in rotation. The speed of the motor will rapidly increase until the pump develops a pressure sufficient to overcome the velocity pressure, when the diaphragm will return to its neutral or balanced position. The contact interrupted, the motor will begin to slow down, until the pressure falls again below pressure in the Pitot tube. In actual practice the diaphragm continuously vibrates maintaining the motor speed at a certain value proportional to the velocity measured. A flywheel 22 is mounted on the motor shaft in order to render the motor speed more uniform.

Fig. 2 represents an arrangement for measuring the flow of elastic fluids, for instance, of the steam in a pipe 23. The chambers 3 and 5 contain steam or air in this case, and the back pressure is furnished by a blower 24. While an electric drive may be also used, the motive power in case of steam in the pipe 23 may be conveniently furnished by a steam turbine 25.

The steam is furnished through a pipe 26 from a valve 27 and a feed pipe 28. The valve consists of a piston 29 attached to the rod 19 of the diaphragm 4. With the diaphragm in a neutral position the cylindrical portion 30 of the piston closes a port 31 in the wall of the housing of the valve thereby closing the steam passage to the turbine. But when the diaphragm deflects it moves the piston down thereby opening the port, which now comes in a communication through a circular groove 32 with a port 33 of the feed pipe 28, thereby admitting steam to a turbine 25. The turbine drives the blower 24 at an increasing speed until the back pressure in the chamber 5 restores the diaphragm to its neutral position, when the steam is cut off again.

The action of my apparatus depends on the proportionality between the peripheral velocity of the pump impeller (or its number of revolutions per minute) and the pressure, and does not depend on any other factors, such as a friction in bearings, losses of the pump or blower, efficiency of the motor, fluctuations of the steam pressure, when turbine is used, or voltage fluctuations, in case of a motor drive. It is important, however, to provide a sensitive diaphragm and to arrange for very close contacts, so that a very small deflection would be sufficient to start the motor.

It is not necessary, of course, to use the contacts for starting the motor, and it may be constantly running at a slow speed from an independent source, the contacts being connected so as to regulate the speed only. There may be a variety of electrical connections for the purpose of regulating the motor speed, and my apparatus will function satisfactorily with most any of them that depend on the contacts.

The object of the diaphragm is to provide a flexible or yielding separator between the Pitot tube and the pump (for the supplemental tube which is connected in all cases with the pump). Instead of the diaphragm a liquid trap may be used in the form of a U-tube 34 (Fig. 3). This tube is partly filled with mercury 35, and the contacts 14 and 15 are placed in a close proximity to the mercury surface. The slight velocity pressure in the Pitot tube will raise the mercury level towards the contacts, closing them and thereby starting the electric motor and the blower (or pump as the case might be). The left leg 36 of the U-tube corresponds to the chamber 3 and the right leg to the chamber 5.

The U-tube may be made of two concentric tubes as per Fig. 4 with an outer tube 37 and inner 36. Such a construction has an advantage for installation on a moving object, such as a boat, the relative level fluctuations being comparatively small.

Important advantages of my indicator are that it is very accurate, can be used for recording movements, and is not affected by the friction of its mechanical component parts.

I claim as my invention:

1. In a speed indicator, the combination with two chambers, a yielding separator between said chambers, a Pitot tube connected with one of said chambers, a balancing tube connected with the other chamber, a rotating device adapted to produce a pressure in said second chamber equivalent to the pressure in said Pitot tube, an indicating device in a cooperative relation to said pressure producing device, and means to regulate the rotation of said pressure producing device, said means being controlled by said yielding separator.

2. In a speed indicator, the combination with two chambers, a yielding separator between said chambers, a Pitot tube connected with one of said chambers, a balancing tube connected with the other chamber, a rotating device adapted to produce a pressure in said second chamber equivalent to the pressure in said Pitot tube, a motor operating said pressure producing device, a speedometer in a cooperative relation to said motor, and means to regulate the speed of said motor, said means being controlled by said yielding separator.

3. In a speed indicator, the combination with two chambers, a yielding separator between said chambers, a Pitot tube connected with one of said chambers, a balancing tube connected with the other chamber, a rotating device adapted to produce a pressure in said second chamber, said rotating device being interposed between said second chamber and said balancing tube, a motor connected with said pressure producing device, an indicating and recording device in a cooperative relation to said motor, and means to regulate the speed of said motor, said means being controlled by said yielding separator.

4. In a speed indicator, the combination with a Pitot tube, a rotating device adapted to produce pressure equal and opposed to the pressure in said Pitot tube, and means to measure the velocity of the fluid in relation to said Pitot tube by measuring the rotational velocity of said pressure producing device.

5. In a speed indicator, the combination with a Pitot tube, a balancing tube, a rotational device interposed between said Pitot tube and said balancing tube, adapted to produce pressure equal and opposed to the dynamic pressure in said Pitot tube, and means to measure the velocity of the fluid in relation to said Pitot tube by measuring the rotational velocity of said pressure producing device.

6. In a speed indicator, the combination with a tube adapted to receive at one end the total pressure of a flowing fluid, a second tube adapted to receive at one end the static only pressure of said fluid, a rotational device adapted to produce pressure equal and opposed to the difference in pressures between the other ends of said tubes, and means to measure the velocity of said fluid in relation to said tubes by measuring the rotational velocity of said pressure producing means.

7. In a speed indicator, the combination with a tube adapted to receive at one end the total pressure of a flowing fluid, a second tube adapted to receive at one end the static only pressure of said fluid, a rotational device interposed between the other ends of said tubes and adapted to produce a pressure equal and opposed to the difference in pressure between the other ends of said tubes, and means to measure the velocity of said fluid in relation to said tubes by measuring the rotational velocity of said pressure producing device.

8. In a speed indicator, the combination with a tube adapted to receive at one end the total pressure of a flowing fluid, a second tube adapted to receive at one end the static only pressure of a flowing fluid, a device interposed between the other ends of said tubes and adapted to be actuated by the difference in pressures between said tubes, a rotational device adapted to produce a pressure equal and opposed to the difference in pressures between said tubes and being controlled by said pressure actuated device, and means to measure the velocity of said fluid in relation to said tubes by measuring the rotational velocity of said pressure producing device.

Signed at New York, in the county of New York and State of New York.

LEONID A. DUNAJEFF.